Figure 1:
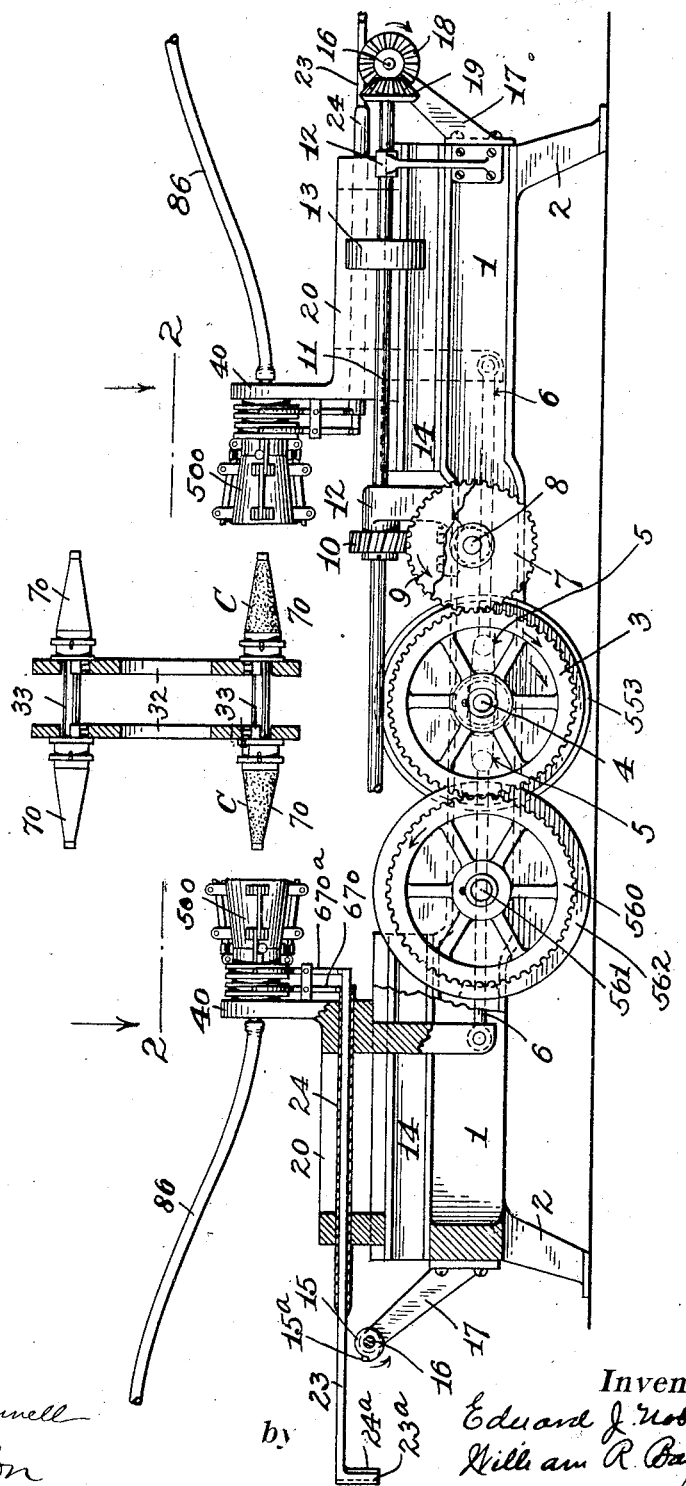

E. J. NOBLE.
WATER EXPRESSING MACHINE.
APPLICATION FILED AUG. 28, 1912.

1,146,810.

Patented July 20, 1915.
11 SHEETS—SHEET 8.

Attest:
Alan C. McDonnell
S. S. Newton

Edward J. Noble, Inventor:
by William R. Baird,
Atty

E. J. NOBLE.
WATER EXPRESSING MACHINE.
APPLICATION FILED AUG. 28, 1912.

1,146,810.

Patented July 20, 1915.
11 SHEETS—SHEET 10.

Attest:
Alan C. McDonnell
B. S. Newton

Inventor:
Edward J. Noble
by William R. Baird Atty

E. J. NOBLE.
WATER EXPRESSING MACHINE.
APPLICATION FILED AUG. 28, 1912.
1,146,810.
Patented July 20, 1915.
11 SHEETS—SHEET 11.
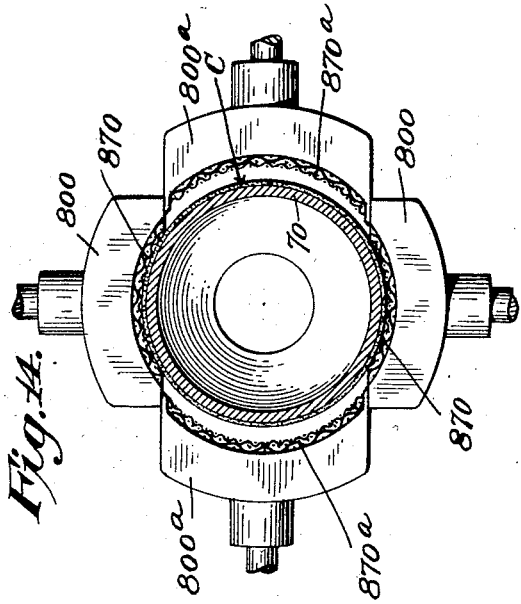
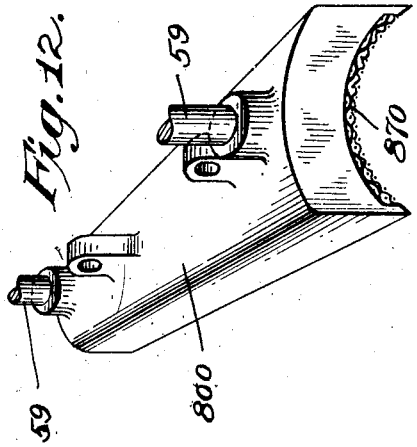
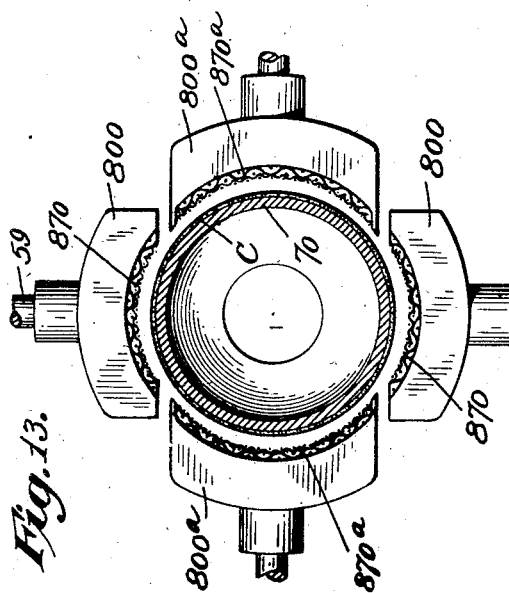
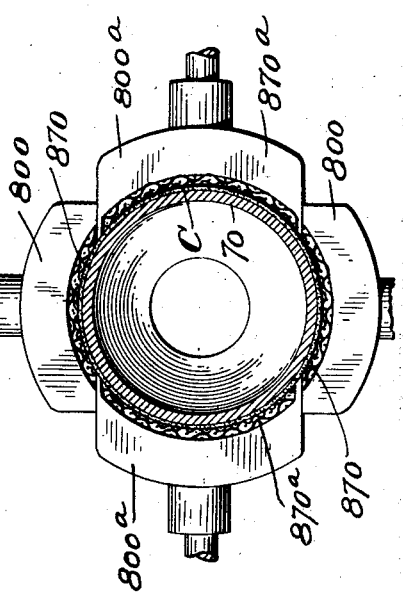
Attest:
Alan C. McDonnell
S. S. Newton
Edward J. Noble, Inventor:
by William R. Baird
Att'y

UNITED STATES PATENT OFFICE.

EDWARD J. NOBLE, OF NEW YORK, N. Y.

WATER-EXPRESSING MACHINE.

1,146,810.  Specification of Letters Patent.  Patented July 20, 1915.

Application filed August 28, 1912. Serial No. 717,419.

*To all whom it may concern:*

Be it known that I, EDWARD J. NOBLE, a citizen of the United States, residing at New York, in the county of New York and State of New York, have invented certain new and useful Improvements in Water-Expressing Machines, of which the following is a specification.

This invention relates to machines for expressing water from plastic material diffused therein, and its novelty consists in the construction and adaptation of the parts as will be more fully hereinafter pointed out.

It is intended to be used in carrying out a step in the process of manufacturing containers from a plastic composition, and which containers are made by transferring from a suitable reservoir or tank to a series of inner molds a proper quantity of the plastic material diffused in water out of which the containers are to be formed, and then subjecting the material on the containers to pressure by outer mold members, the plastic material assuming the shape of the space between the outer and inner mold members.

The particular composition out of which the containers referred to are to be formed is not my invention but forms the subject matter of an application for Letters Patent of the United States of Charles S. Dolley, filed July 11, 1912, Serial No. 708,755. The ingredients consist briefly of kaolin or some other suitable inorganic silicate, wood pulp, casein, gelatin, a resinate soluble in water, as sodium resinate, and balata or some other gutta gum. All of these ingredients, except the gutta gum, are first brought by any suitable means to a finely divided state and are gradually combined while dry until thoroughly and uniformly mixed, when there is added to the mass a quantity of water sufficient to form an emulsion. The gutta gum, which has previously been dissolved in a suitable solvent, is then gradually added to the mass by spraying the same in solution upon the other ingredients while they are being mixed. There is thus formed a mass of the ingredients diffused in water which is treated in the machine above referred to.

It will be understood that materials of similar nature may be similarly treated and that the invention does not reside merely in the application or use of the machine to the treatment of the particular composition mentioned, as it can readily be applied by those skilled in the art to the treatment of similar materials having analogous characteristics.

The mixture of the chosen ingredients diffused in water is, as above stated, led into a suitable chamber or receptacle, from which it is picked up and felted or transferred to mold members which are adapted to be carried by a conveying system to the mechanism about to be described. During this transfer, much of the water which has adhered to the particles of the mixture is removed mechanically by gravity and also by evaporation by bringing the same into contact with currents of air which may be heated or otherwise to facilitate such removal, but a considerable quantity of water remains with the mass of material, and it is the function or purpose of the apparatus which forms the subject matter of this application to cause the removal of a large portion of the water so mechanically intermingled or mixed with the ingredients out of which the container is to be formed, by means of mechanical pressure brought to bear upon the material on the inner molds by means of foraminous clamping plates provided with means for externally draining the same after the water has been removed.

Figure 2:
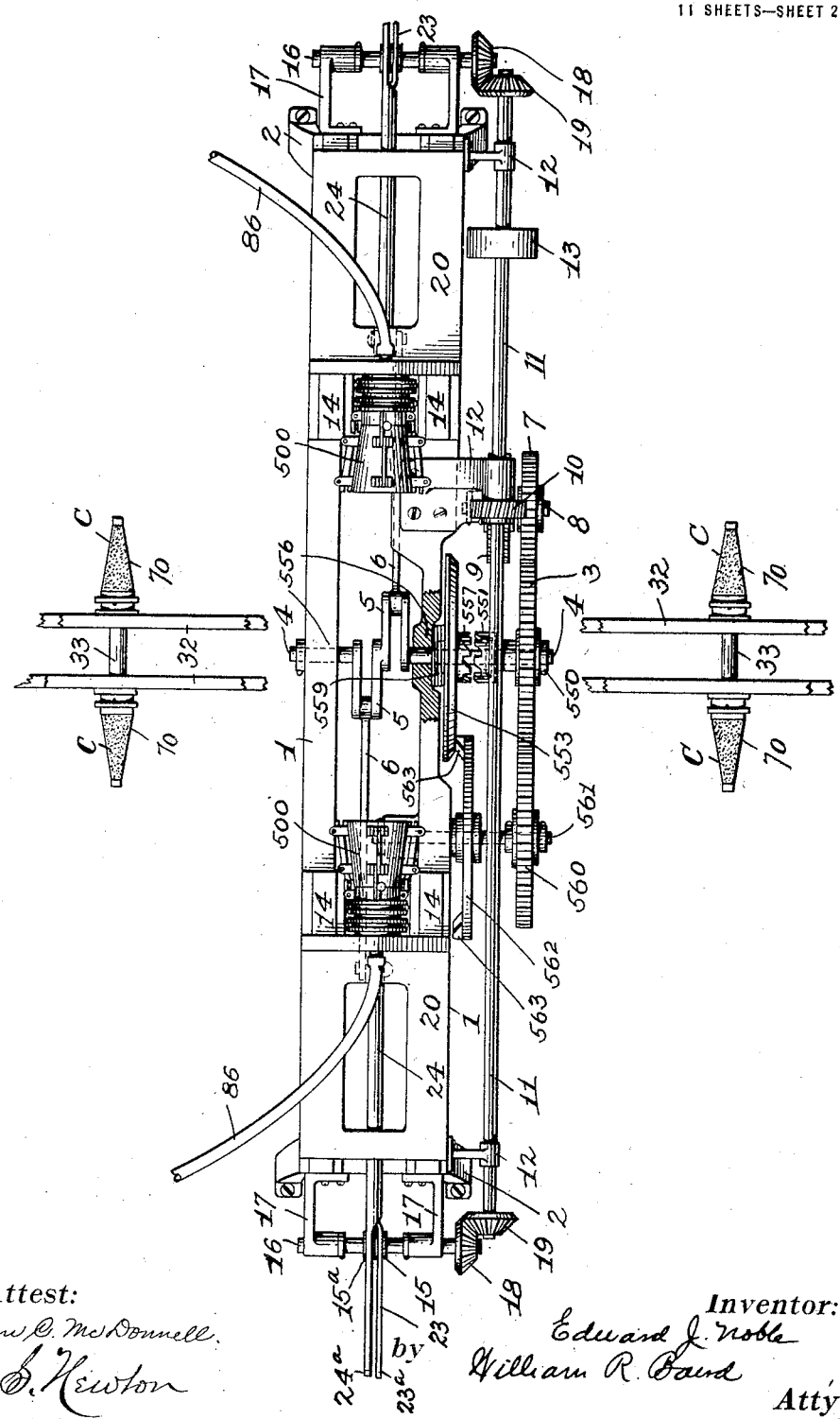
Figure 3:
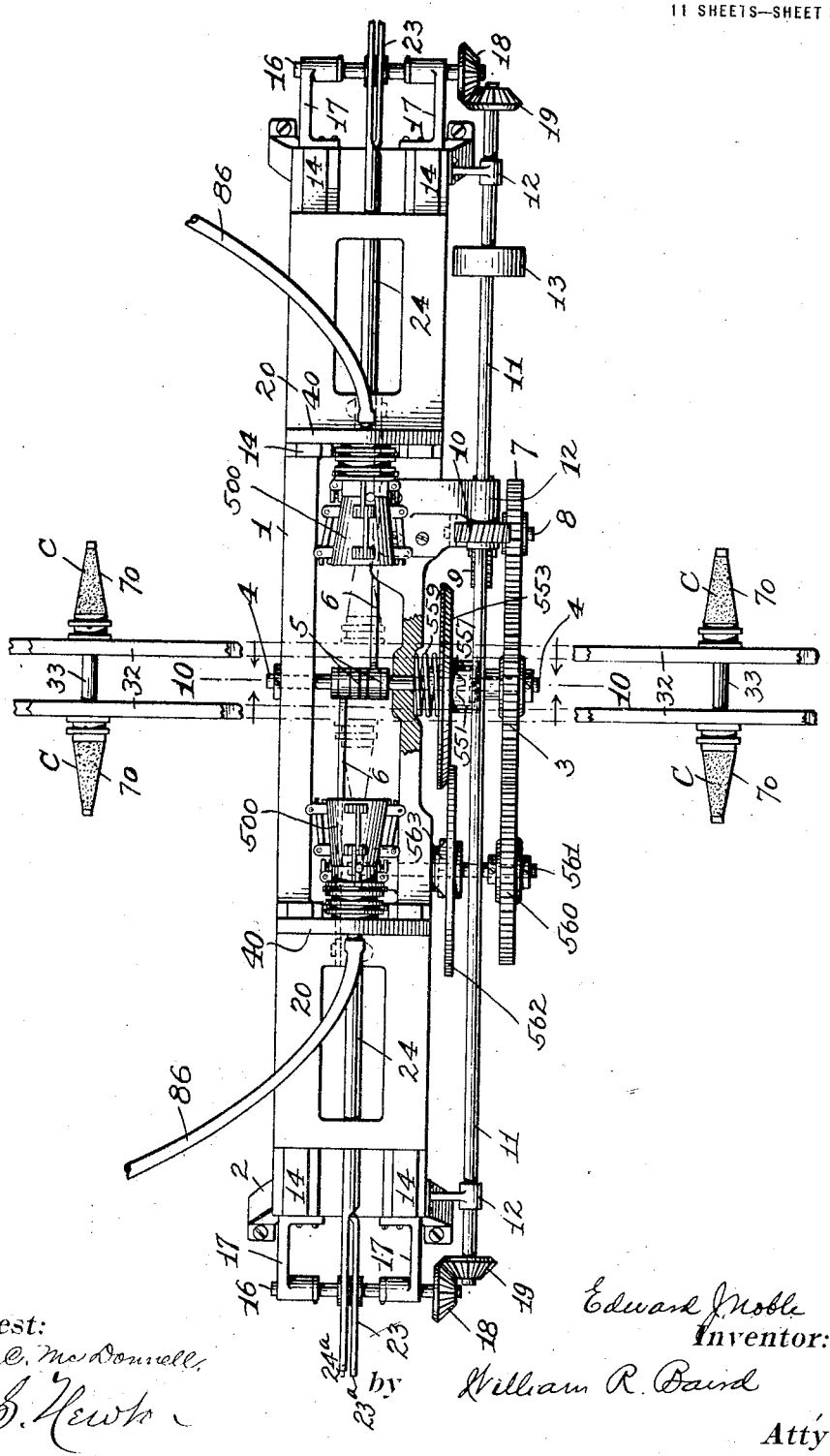
Figure 4:
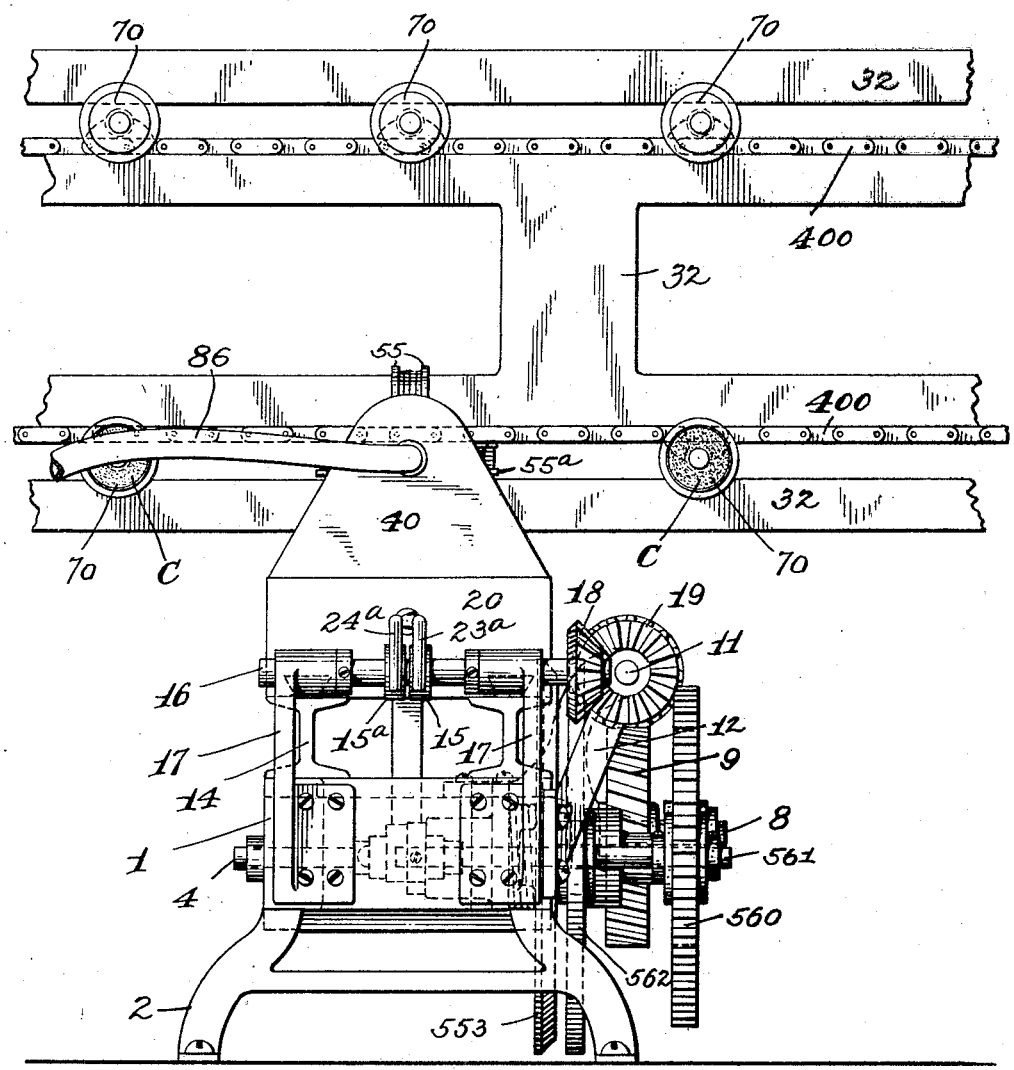
Figure 5:
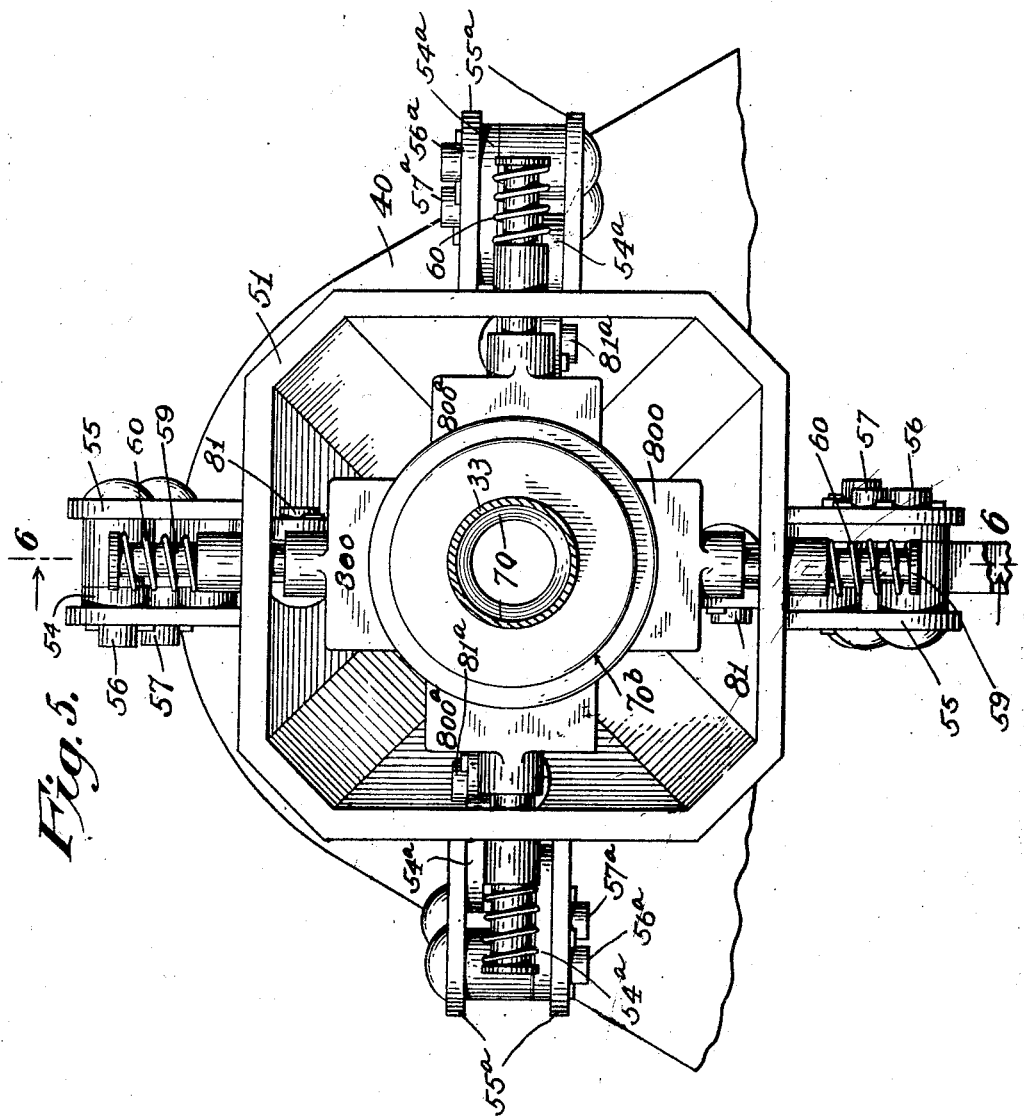
Figure 6:
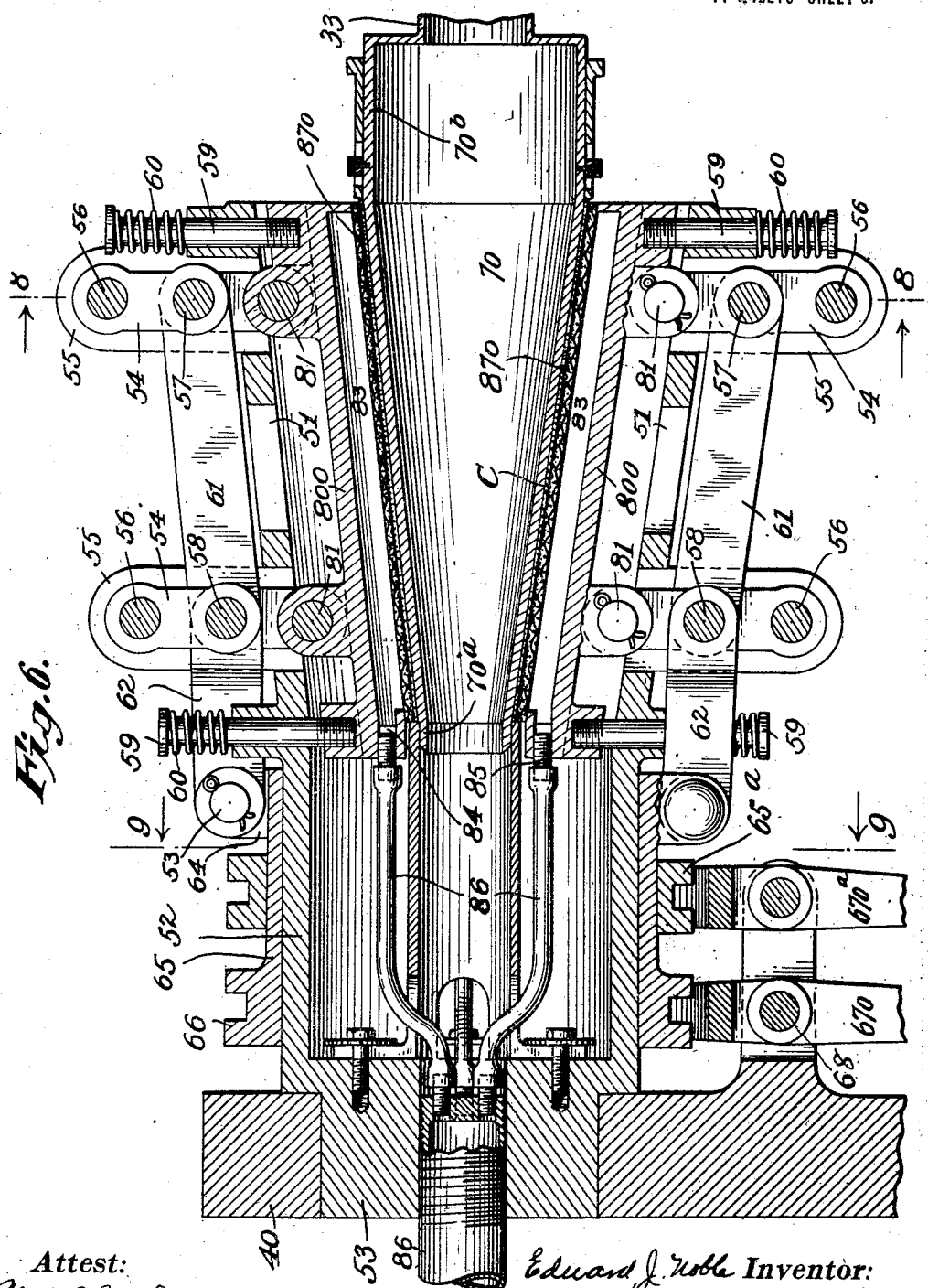
Figure 7:
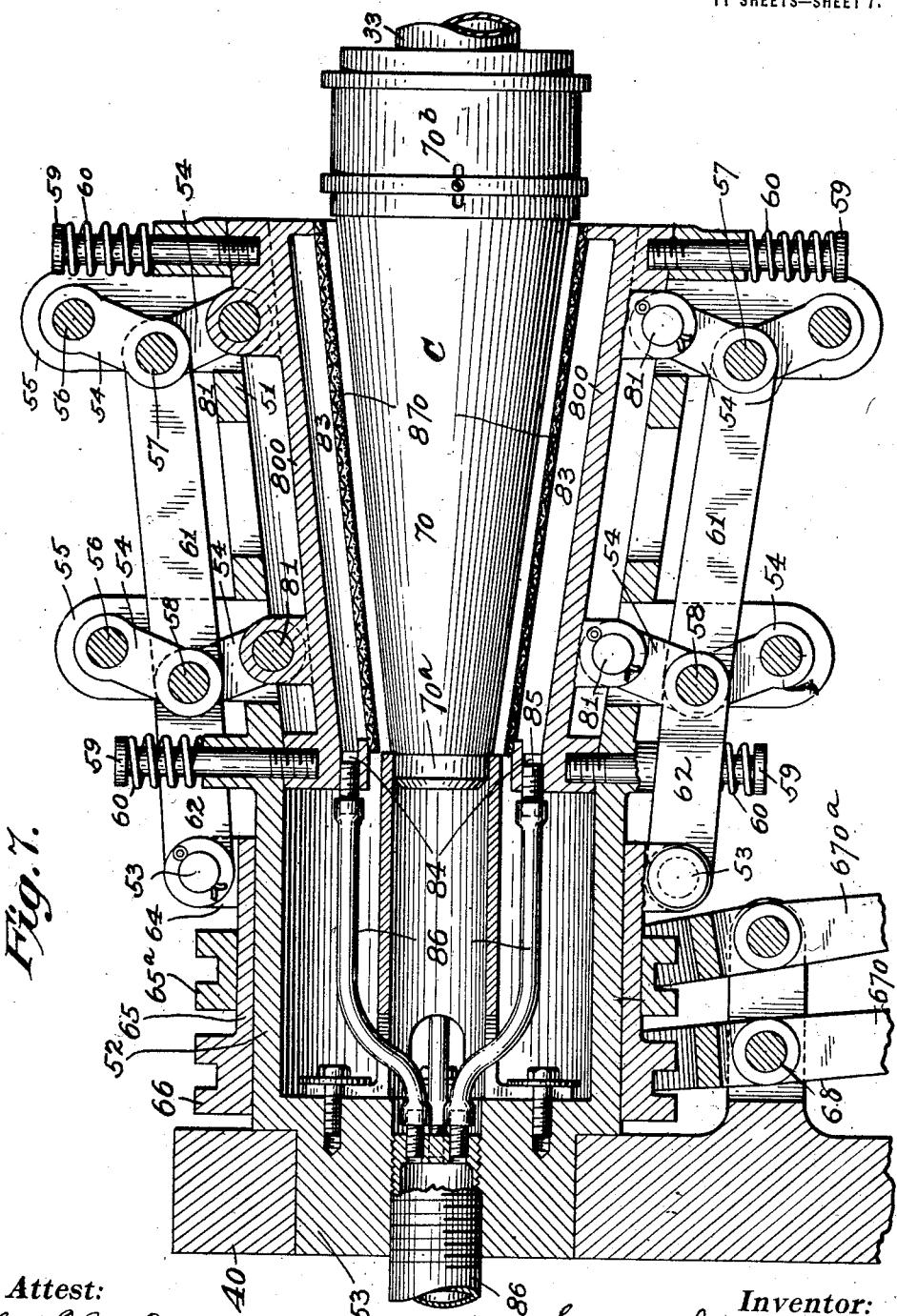
Figure 8:
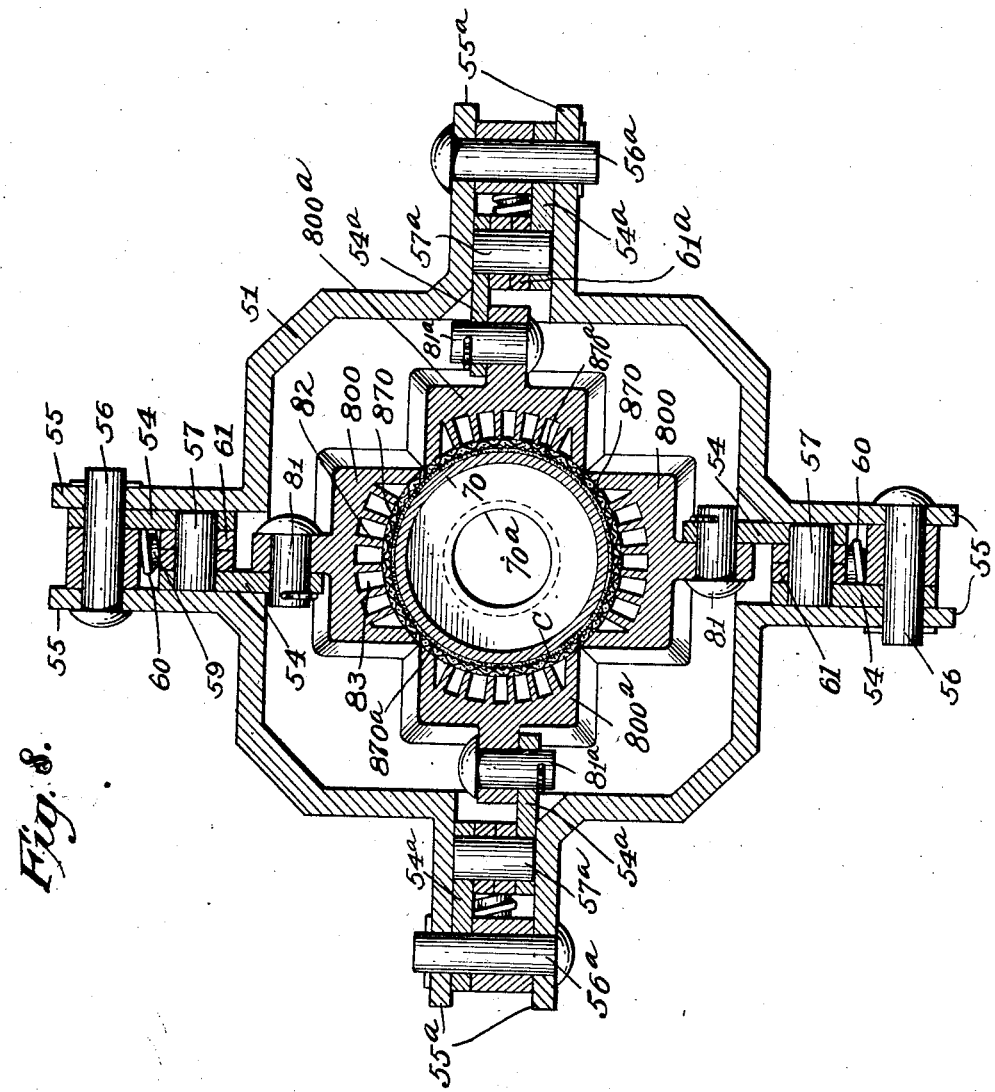
Figure 9:
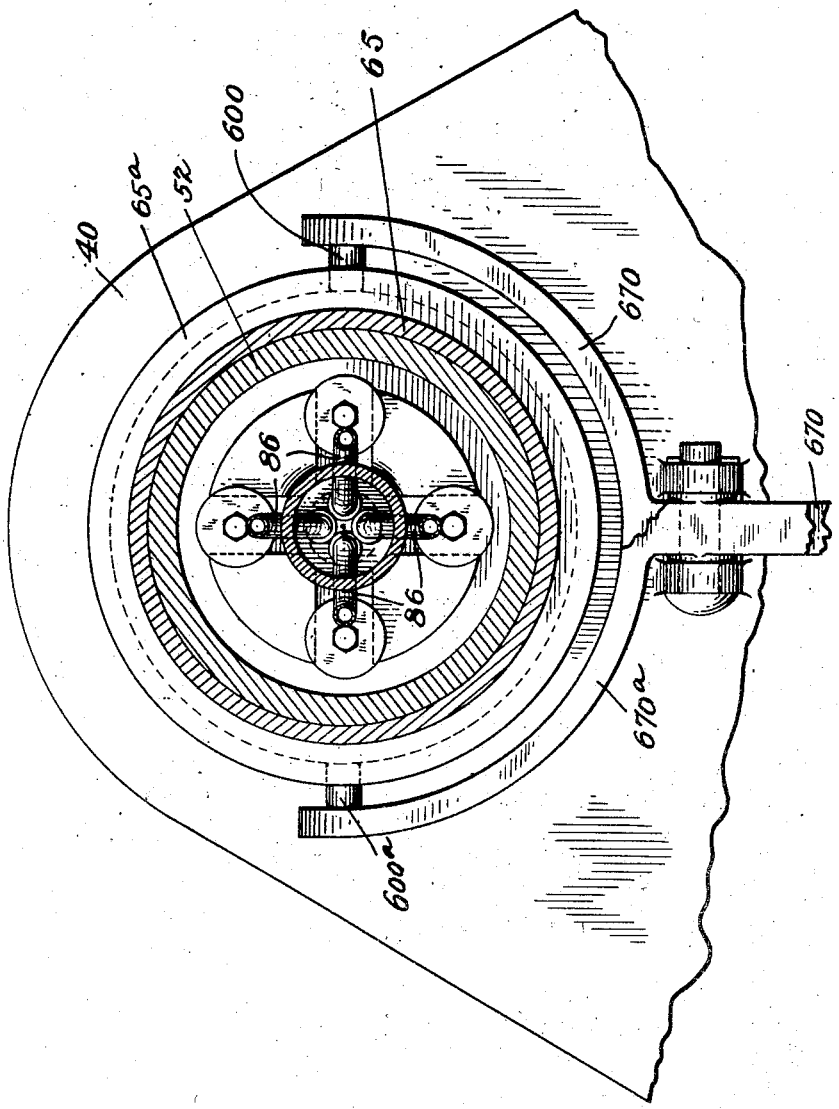
Figure 10:
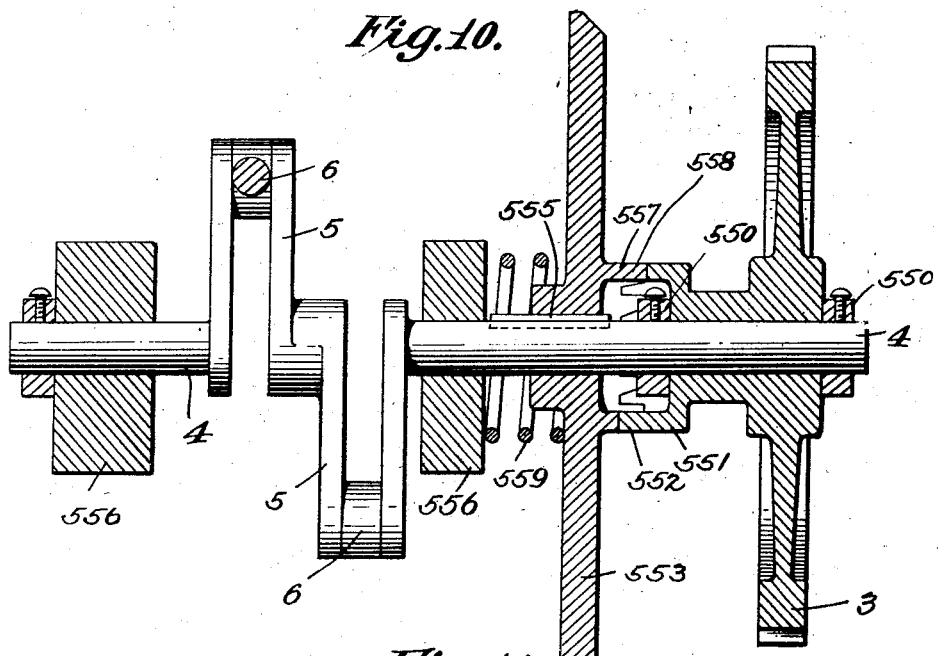
Figure 11:
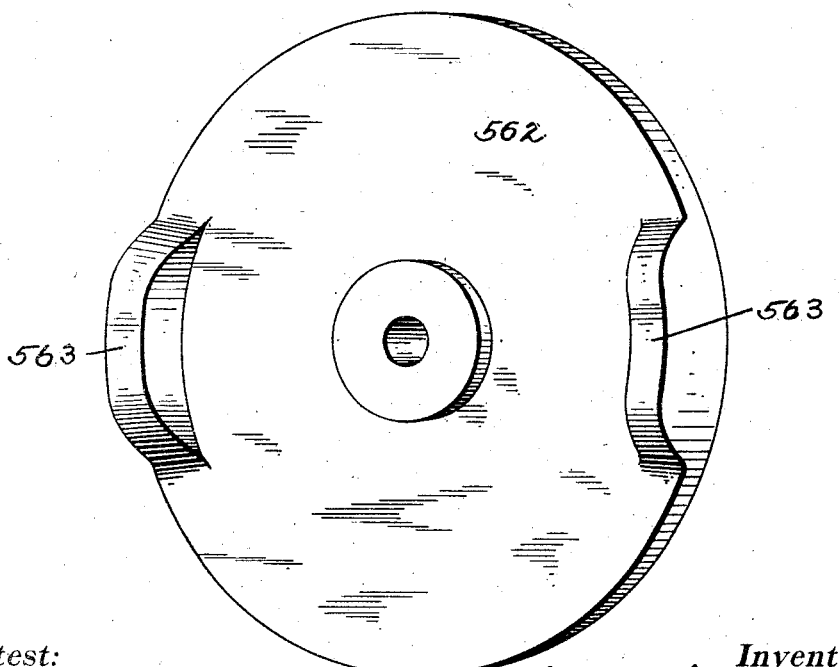

In the drawings, Figure 1 is a side elevation, partly broken away to show concealed parts, of an apparatus embodying the invention; Fig. 2 is a top plan view of the same, also partly in section; Fig. 3 is a view similar to Fig. 2 but with the parts in different positions; Fig. 4 is an end elevation of the machine; Fig. 5 is an end elevation of one of the clamp holders; Fig. 6 is a longitudinal central section of the same on the plane of the line 6—6 in Fig. 5; Fig. 7 is a view similar to Fig. 6 but with the foraminous clamps shown in a position away from the inner mold; Fig. 8 is a vertical cross section of one of the holders on the plane of the line 8—8 in Fig. 6; Fig. 9 is a view similar to Fig. 8 but on the plane of the line 9—9 in Fig. 6; Fig. 10 is a central vertical section of the crank shaft and adjacent parts on the plane of the line 10—10 in Fig. 1; Fig. 11 is a detail perspective view of the clutch operating hand wheel; Fig. 12 is a detail perspective view of one of the foraminous clamps; and Figs. 13, 14 and 15 are transverse sections of the inner mold with the foraminous clamps in different positions showing the relative movements of such clamps toward the mold during the water-expressing operation.

In the drawings, 1 is a bed-plate supported in any suitable maner as on legs 2.

3 is a gear wheel loosely mounted on a crank shaft 4 suitably mounted to revolve in bearings 556 in the bed-plate, and having diametrically opposed cranks 5, 5 to which are pivoted connecting rods 6, 6, the other ends of which are pivoted to carriages 20, 20 adapted to be reciprocated above the bed-plate as hereinafter described.

The gear wheel 3 meshes with a pinion 7 mounted on a stub shaft 8 adapted to revolve in bearings in the plate 1, and is connected to a spiral gear 9, and which meshes with a worm gear 10 mounted on a main driving shaft 11 suitably supported in bearings 12, and having a pulley 13 mounted thereon at a suitable place, and which pulley is actuated by a belt (not shown) from a suitable source of energy.

Each reciprocating carriage 20 comprises a rectangular casting adapted to reciprocate on slideways 14 supported upon and secured to the bed-plate 1. Each carriage has mounted rigidly on its inner end a plate 40 on which are mounted holders 500 as hereinafter described. Slidably mounted within the carriage 20 is a hollow shaft 24 within which is a second shaft 23. The inner ends of the shafts 24 and 23 are respectively pivoted to forked levers 670 and 670$^a$ mounted on the plate 40. The outer ends of the shafts 23 and 24 are turned at 23$^a$ and 24$^a$ and formed into hooks which are adapted to engage cams 15 and 15$^a$ which are fast to a transverse shaft 16 suitably mounted in bracket bearings 17 and connected to the driving shaft 11 by bevel gears 18 and 19. Over the center of the bed-plate 1 there is arranged a double track 32. This is adapted to support a number of arbors 33 on each end of which are mounted male molds 70 which are conveyed along the tracks 32 by means of a suitable conveyer 400.

It will be evident that when the crank shaft 4 is rotated, each carriage 20 with the plate 40 and its holder 500 will reciprocate in the ways 14 on each side of the machine. As the holders move forward toward the center of the machine, the end of the stroke will bring them in such a position that they will surround or envelop the inner molds 70, which in the particular form shown are frusto-conical in shape, and which have had deposited thereon (during the previous operation of the apparatus) a coating of fresh plastic material C.

The holder 500 comprises first a casing 51 which is substantially octagonal in section at its inner end and which tapers toward the outer end, at which point it merges into a cylinder 52 and, as it continues, merges into a yet smaller cylinder 53 secured to the plate 40. Suspended within the casing 51 are two vertical squeezers 800 and two horizontal squeezers 800$^a$, each covering approximately a quarter of a circle on its inner surface. The two vertical squeezers are pivoted at 81 through projecting lugs and are suspended from the casing 51 by pairs of toggle levers 54, 54 pivoted at 56 between lugs 55 on the outside of the casing. Each set of toggles 54, 54 is connected by a cross bar 61 pivoted to them at 57 and 58. The vertical squeezers are further supported by guide pins 59 which project through the casing 51 and screw into the squeezers. Compression springs 60 are provided between the head of each pin 59 and the casing and they tend to draw the squeezers away from the center of the mold. The horizontal squeezers 800$^a$ are similarly suspended by pivots 81$^a$ and toggle levers 54$^a$ pivoted at 56$^a$ between the lugs 55$^a$ on the outside of the casing 51. Each set of toggles 54$^a$ is connected by a bar 61$^a$ pivoted to the toggles 54$^a$ at 57$^a$ and 58$^a$.

Means are provided for operating the vertical squeezers 800. A bar 62 is pivoted at one end to the toggles 54, 54 at 58 and at the other end to a pin 63 mounted in lugs 64 made integral with a cylindrical collar 65 slidably mounted on the reduced portion 52 of the casing 51. The collar 65 is provided with an annular flange 66 grooved to receive pins 600 on the end of a forked lever 670 pivoted at 68 to the plate 40, the other end of which lever is pivoted to the hollow shaft 24 having the hook 24$^a$ adapted to engage the cam 15$^a$ (see Fig. 1). It is evident that when the hook 24$^a$ engages the high portion on the cam 15$^a$ the shaft 24 will be drawn out, thus rocking the lever 66 and pushing forward the collar 64 and straightening out the toggles 54 against the tension of the springs 60. Similar means are provided for operating the horizontal squeezers 800$^a$ by a bar, one end of which is pivoted to the toggles 54$^a$ and the other end to a pin mounted in lugs integral with a grooved ring 65$^a$ slidably mounted on the collar 65. The grooved ring 65$^a$ receives within its groove pins 600$^a$ on the end of the forked lever 670$^a$ which is pivoted to the plate 40, and the other end of which lever is pivoted to the rod 23, the hook 23$^a$ being adapted to engage the cam 15. The cam 15 is timed to move slightly ahead of the horizontal squeezers 800$^a$.

The male mold 70 consists of a hollow cone having a cylindrical portion 70$^a$ at its smaller end and a cylindrical portion 70$^b$ at its larger end. The portion 70$^b$ is reduced to form the arbor 33 which may be integral therewith or suitably secured thereto. It is adapted to be attached to a similar inner mold on its opposite side.

The construction of the vertical and horizontal squeezers 800 and 800$^a$ is as follows. The construction being the same, the description will be analogous. Referring to Figs. 6 and 8, the squeezers 800 are substantially rectangular in shape. Their inner surfaces conform to that of the inner mold and are approximately a quadrant in cross section. They are also provided with radial partitions 82, to form air passages 83 which terminate in a common chamber 84 at the small end of the mold having an outlet pipe 85 adapted to be connected to flexible pipes 86 leading to an exhaust air pump. A curved sieving plate 870 made of woven wire or similar foraminous material is attached to the inner surface of the squeezers. By the proper timing of the cams 15 and 15$^a$ which move the vertical and horizontal squeezers 800 and 800$^a$, the vertical squeezers will move in synchronism and likewise the horizontal squeezers, but the vertical squeezers will move slightly in advance of the horizontal squeezers, their progressive positions being shown in Figs. 13, 14 and 15.

It will be understood that the conveyer is intermittently moved so that the inner molds are brought to rest opposite the squeezer holders 500. The purpose of the apparatus is to cause the holders to envelop or surround the inner molds while they are at rest and to cause the squeezers to move toward and tightly embrace the material on the molds so as to express or squeeze out the excess water therein, and then to cause the squeezers to move away from the molds and the holders on their carriages to be reciprocated out of the way of the conveyer to allow the inner molds to continue on their journey. It is obvious that the movement of the parts must be timed to perform their functions in proper succession. To that end a clutching mechanism is employed which will now be described. The gear wheel 3 is, as stated above, loosely mounted to rotate on the crank shaft 4. On each side of it and fixed on the shaft are collars 550 which serve to fix its position. On one side its hub is extended to form one member 551 of a clutch, the periphery of which member is provided with sloping teeth 552. Alongside of the gear 3 is a disk 553 having a beveled edge 554 and which disk is mounted on the shaft 4 and rotates thereafter and is adapted to slide longitudinally thereon, being secured by a key indicated at 555. Its hub is extended to form the second member 557 of the clutch above referred to, and its periphery is provided with sloping teeth 558 adapted to engage the teeth 552. A compression spring 559 tends to press the disk 553 toward the gear 3 and to promote the engagement of the clutch members. A gear 560 mounted on a shaft 561 adapted to rotate in bearings in the frame of the shaft is in constant mesh with the gear 3. Also mounted on the same shaft 561 is a cam disk 562 having arranged at diametrically opposite places on its edge two inwardly projecting cam surfaces 563. This disk is so placed that these cams overlap the edge of the disk 553, so that as it rotates, twice in each revolution when the cam surfaces 563 contact with the disk 553, the latter is moved against the tension of the spring 559, its clutch member is moved out of engagement with the clutch member on the gear 3, and while so out of engagement the power of the main shaft 1 is not transmitted to the crank shaft 4, and the carriages are at rest, and this period of rest occurs at each end of the stroke due to the diametrically opposite positions of the cam surfaces 563.

The operation of the machine is as follows: Supposing the parts are in the positions shown in Figs. 6 and 8, the squeezers tightly clamped against the inner mold, the holders being at their innermost position. The shafts 23 and 24 will disengage from the cams 15 and 15$^a$ by the continued rotation of the latter. This will cause the levers 670 and 670$^a$ to move slightly and break the lock of the toggle levers 54, 54$^a$ and the squeezers under the influence of the springs 60 are moved away from the inner molds which they have surrounded and coincident with that movement the levers 670 and 670$^a$ with the rings 66 and 65 take their original position, so that the parts are brought to the positions shown in Fig. 7. In the meantime the continued rotation of the gear 560 has brought the cam plate 562 into position to operate the clutch and transmit the power from the main shaft 11 through the crank shaft 4 to cranks 5 and carriages 20 and the holders 500 will move away from the inner molds to the end of the stroke. The carriages will then rest until the clutch is again operated, when they will move toward the conveyer until they reach the innermost position and again surround the inner molds. At the end of the stroke, the shafts 23 and 24 engage the cams 15 and 15$^a$ and operate the toggle lever system and lock the squeezers down upon the material on the inner molds, moving the two vertical squeezers slightly in advance of the two horizontal squeezers. As the compression of the plastic material occurs, a section is placed on the conduits 86 and tends to remove the moisture squeezed out of the material. The cycle of operations is then repeated.

What I claim is:

1. In combination a suitable frame, squeezers adapted to be reciprocated thereon to and from a central point, a conveyer adapted to be intermittently moved to bring molds in pairs at rest opposite the path of said squeezers and means for moving the squeezers to and from the molds while the conveyer is at rest.

2. In an apparatus of the kind described squeezers comprising a plurality of longitudinal conical sectors forming when assembled the frustum of a cone, the sectors being in opposing pairs each adapted to encircle a quadrant, in combination with means for moving the sections inwardly and outwardly one pair in advance of the other.

3. A squeezer comprising sectors in pairs, supports for the sectors comprising toggle levers, and means for flexing and straightening the levers of the several pairs of sectors in sequence.

4. In combination, a frame, a carriage adapted to be reciprocated thereon, a squeezer holder mounted on the carriage, a squeezer within the holder and means for operating the squeezer comprising a lever normally out of contact with the frame but adapted to contact with the frame when the carriage is reciprocated.

5. In combination, a frame, a carriage adapted to be reciprocated thereon, a squeezer holder mounted on the carriage, a squeezer within the holder and means for operating the squeezer comprising a lever and a cam on the frame adapted to contact with the lever when the carriage is moved.

6. In combination, a frame, a carriage adapted to be reciprocated thereon, a squeezer holder mounted on the carriage, a squeezer within the holder made in sectors in pairs, and means for operating the sectors comprising a lever and a cam on the frame adapted to contact with the lever when the carriage is moved.

7. In combination, a frame, a carriage adapted to be reciprocated thereon, a squeezer holder mounted on the carriage, a squeezer within the holder comprising a vertical pair and a horizontal pair of sectors.

8. In combination, a frame, a carriage adapted to be reciprocated thereon, a squeezer holder mounted on the carriage, a squeezer within the holder comprising a vertical pair and a horizontal pair of sectors, and means for moving the pairs, including toggle levers pivoted to each sector and the holder and levers connected to said toggle levers and adapted to be moved by the reciprocation of the carriage.

9. In combination, a frame, a carriage adapted to be reciprocated thereon, a squeezer holder mounted on the carriage, a squeezer within the holder comprising a vertical pair and a horizontal pair of sectors and means for moving the pairs, including toggle levers pivoted to each sector and the holder and actuating levers pivoted one to each pair of toggle levers and means for moving the actuating levers.

10. In combination, a frame, a carriage adapted to be reciprocated thereon, a squeezer holder mounted on the carriage, a squeezer within the holder comprising a vertical pair and a horizontal pair of sectors and means for moving the pairs, including toggle levers pivoted to each sector and the holder and actuating levers pivoted one to each pair of toggle levers and means for moving the actuating levers by the reciprocation of the carriage.

11. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a lever pivoted to the vertical squeezer toggles, a second lever pivoted to the horizontal squeezer toggles and means for moving both levers.

12. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a lever pivoted to the vertical squeezer toggles, a second lever pivoted to the horizontal squeezer toggles and means for moving both levers in succession.

13. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a lever pivoted to the vertical squeezer toggles, a second lever pivoted to the horizontal squeezer toggles and means for moving both levers in succession by the reciprocation of the carriage.

14. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a hollow lever pivoted to the vertical squeezer toggles, and a lever arranged within the hollow lever pivoted to the horizontal squeezer toggles.

15. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a hollow lever pivoted to the vertical squeezer toggles, and a lever arranged within the hollow lever pivoted to the horizontal squeezer toggles, and means for moving both levers in succession.

16. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a hollow lever pivoted to the vertical squeezer toggles, and a lever arranged within the hollow lever pivoted to the horizontal squeezer toggles, and means for moving both levers in succession by the reciprocation of the carriage.

17. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a lever pivoted to the vertical squeezer toggles, a second lever pivoted to the horizontal squeezer toggles and means for moving both levers by bringing the same into contact with cams suitably placed on the frame of the machine.

18. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a lever pivoted to the vertical squeezer toggles, a second lever pivoted to the horizontal squeezer toggles and means for moving both levers in succession by the reciprocation of the carriage by bringing the same into contact with cams suitably placed on the frame of the machine.

19. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a hollow lever pivoted to the vertical squeezer toggles, and a lever arranged within the hollow lever pivoted to the horizontal squeezer toggles, and means for moving both levers by bringing the same into contact with cams suitably placed on the frame of the machine.

20. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a hollow lever pivoted to the vertical squeezer toggles, and a lever arranged within the hollow lever pivoted to the horizontal squeezer toggles, and means for moving both levers in succession by bringing the same into contact with cams suitably placed on the frame of the machine.

21. In combination, a frame, a carriage adapted to be reciprocated thereon, a squeezer holder mounted on the carriage, a squeezer within the holder comprising a vertical pair and a horizontal pair of sectors and means for moving the pairs at separate times including toggle levers pivoted to each sector and the holders, a hollow lever pivoted to the vertical squeezer toggles, and a lever arranged within the hollow lever pivoted to the horizontal squeezer toggles, and means for moving both levers in succession by the reciprocation of the carriage by bringing the same into contact with cams suitably placed on the frame of the machine.

22. In combination a frame, a carriage adapted to be reciprocated thereon, a squeezer holder mounted in the carriage, a squeezer within the holder, means for operating the squeezer and means for creating a partial vacuum back of the squeezer.

23. In combination, an inner mold adapted to support a layer of plastic material containing water, a squeezer in sections adapted to compress the material on the mold and means for creating a partial vacuum back of the squeezer.

24. In combination, an inner mold adapted to support a layer of plastic material containing water, a squeezer having a foraminous surface adapted to contact with the plastic material, means for pressing such surface against the material and means for draining the rear side thereof, comprising means for creating a partial vacuum thereat.

25. In combination, an inner mold adapted to support a layer of plastic material containing water, a squeezer having a foraminous surface adapted to contact with the plastic material, means for moving the foraminous surface to and from the plastic material of the inner mold and means for draining the rear side of such surface, comprising means for creating a partial vacuum thereat.

26. In apparatus of the kind described, in combination, a frame, squeezers thereon movable toward and from each other, each squeezer comprising relatively movable sections, a conveyer intermittently movable to bring molds in alined pairs to rest in the path of said squeezers, means for moving the squeezers toward and from the molds while the conveyer is at rest, and means for causing relative movement of the squeezer sectors.

27. In apparatus of the kind described, in combination, a frame, squeezers thereon movable toward and from each other, each squeezer comprising relatively movable sections, a conveyer intermittently movable to bring molds in alined pairs to rest in the path of said squeezers, means for moving the squeezers toward and from the molds while the conveyer is at rest, and means for causing relative movement of the squeezer sectors, the operation of the last named means being controlled by the movement of the squeezers toward and from each other.

In testimony whereof I affix my signature in presence of two witnesses.

EDWARD J. NOBLE.

Witnesses:
ALAN C. McDONNELL,
MARY H. LEWIS.